(12) United States Patent
Arens

(10) Patent No.: US 10,649,223 B2
(45) Date of Patent: May 12, 2020

(54) RETICLE HAVING AN ILLUMINATION DEVICE

(71) Applicant: IMT Masken und Teilungen AG, Greifensee (CH)

(72) Inventor: Winfried Arens, Gibswil (CH)

(73) Assignee: IMT MASKEN UND TEILUNGEN AG, Greifensee (CH)

( * ) Notice: Subject to any disclaimer, the term of this patent is extended or adjusted under 35 U.S.C. 154(b) by 60 days.

(21) Appl. No.: 15/917,902

(22) Filed: Mar. 12, 2018

(65) Prior Publication Data

US 2018/0267327 A1    Sep. 20, 2018

(30) Foreign Application Priority Data

Mar. 13, 2017   (DE) .................. 10 2017 204 094

(51) Int. Cl.
| | |
|---|---|
| G02B 23/00 | (2006.01) |
| G02B 17/00 | (2006.01) |
| G02B 27/34 | (2006.01) |
| G02B 27/00 | (2006.01) |
| G02B 17/08 | (2006.01) |

(52) U.S. Cl.
CPC ......... *G02B 27/34* (2013.01); *G02B 17/0868* (2013.01); *G02B 27/0006* (2013.01)

(58) Field of Classification Search
CPC . G02B 27/34; G02B 17/0868; G02B 27/0006
USPC ....................... 359/428, 726, 730
See application file for complete search history.

(56) References Cited

U.S. PATENT DOCUMENTS

2011/0228395 A1*  9/2011  Kammans ............. F41G 1/345
359/566

FOREIGN PATENT DOCUMENTS

EP         0886163 B1    12/1998
WO    WO 2011113547 A1    9/2011

\* cited by examiner

*Primary Examiner* — William Choi
(74) *Attorney, Agent, or Firm* — Leydig, Voit & Mayer, Ltd.

(57) ABSTRACT

A reticle includes an illumination device having an optical component configured to introduce light from a light source into the reticle. The optical component has an entrance face and a reflecting face for the light of the light source. Two parallel bounding surfaces that are oriented perpendicular to an optical axis have an optical marking. A peripheral edge joins the bounding surfaces. The optical component is disposed at the peripheral edge of the reticle such that the light of the light source enters the reticle via the entrance face and the reflecting face and impinges on the marking. The entrance face is configured to act as a collecting lens on which the light of the light source impinges divergently.

20 Claims, 2 Drawing Sheets

RETICLE HAVING AN ILLUMINATION DEVICE

CROSS-REFERENCE TO PRIOR APPLICATION

Priority is claimed to German Patent Application No. DE 10 2017 204 094.7, filed on Mar. 13, 2017, the entire disclosure of which is hereby incorporated by reference herein.

FIELD

The present invention relates to a reticle having an illumination device, such as is used in microscopes, telescopic sights, field glasses and other optical devices. Such reticles carry markings that superimposed on the image being viewed so as to serve as a dimensional reference or as an aiming mark.

BACKGROUND

An illuminated reticle is known from EP 0886163 B1. The reticle is a glass plate and has a marking in the form of an optical grating which is illuminated by light entering the reticle from the side. The grating parameters are selected such that the light is deflected by the marking toward the eye of the viewer.

WO 2011/113547 A1 describes a device for illuminating the marking of a reticle. The light of a divergently emitting light source is collected by a collimator lens and then enters through an entrance face into an input coupling prism cemented laterally to the reticle. The light is redirected by a reflecting face of the prism toward the peripheral edge of the reticle, where it finally impinges on the marking to be illuminated. However, this illumination device is relatively complex in construction because the light source, the collimator lens and the input coupling prism must be adjusted with respect to each other.

SUMMARY

In an embodiment, the present invention provides a reticle including an illumination device having an optical component configured to introduce light from a light source into the reticle. The optical component has an entrance face and a reflecting face for the light of the light source. Two parallel bounding surfaces that are oriented perpendicular to an optical axis have an optical marking. A peripheral edge joins the bounding surfaces. The optical component is disposed at the peripheral edge of the reticle such that the light of the light source enters the reticle via the entrance face and the reflecting face and impinges on the marking. The entrance face is configured to act as a collecting lens on which the light of the light source impinges divergently.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a reticle having an illumination device which is simplified in construction and particularly inexpensive to manufacture.

According to an embodiment, a reticle is provided having an illumination device including an optical component for introducing light from a light source into the reticle, the reticle having two parallel bounding surfaces oriented perpendicular to an optical axis and having an optical marking, as well as a peripheral edge joining the bounding surface surfaces. The optical component has an entrance face and a reflecting face for the light of the light source. The optical component is disposed at the edge of the reticle so that the light of the light source enters the reticle via the entrance face and the reflecting face and impinges on the marking. Specifically, the light of the light source impinges divergently on the entrance face of the optical component. The entrance face of the optical component acts as a collecting lens and converts the divergent incident light of the light source into a convergent beam which is subsequently used to selectively illuminate the marking. The entrance face may be configured as an aspherical lens or as a Fresnel lens or be provided with a suitable diffractive optic that collects the light.

The reflecting face is inclined such that the light is reflected inside the optical component by total internal reflection, so that there is no need for a reflective coating on the reflecting face.

Since the number of optical components is reduced compared to the prior art, the assembly is sturdier, more reliable and, in addition, requires less space.

It is especially advantageous that the optical component and its two functional surfaces (entrance face as a collecting lens, reflecting face) can be manufactured as a monolithic injection-molded part. A collimator lens, which would have to be additionally adjusted as in the prior art, is not needed, which significantly reduces the assembly effort. Moreover, the monolithic optical component may also be configured with holding structures for the light source, so that, for example, a light-emitting diode can be easily attached to the optical component.

Figure 1:
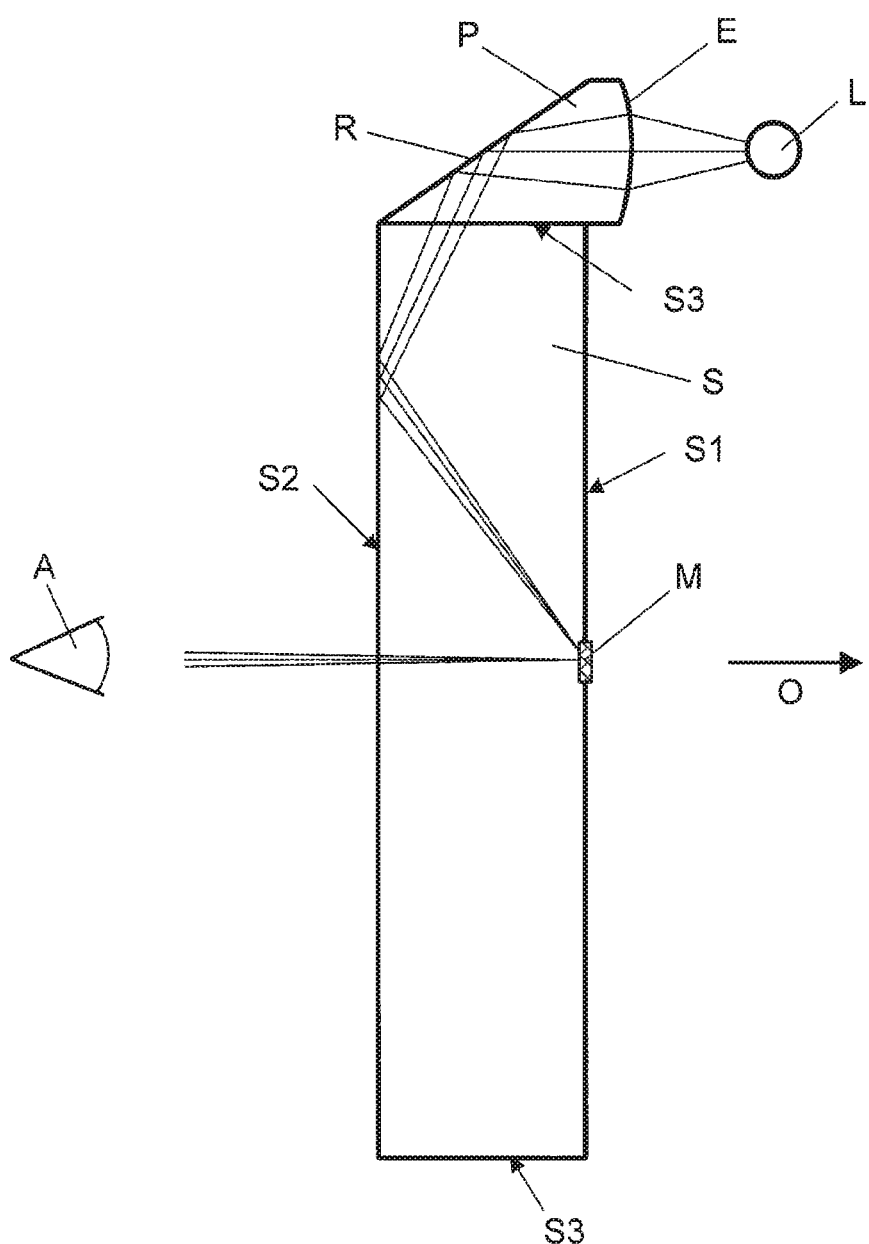
FIG. 1 shows a side view of a reticle.

FIG. 1 shows in side view a reticle S along with an illumination device including a light source L and an optical component P.

Reticle S is, for example, a circular glass disk whose front and rear bounding surfaces S1, S2 are perpendicular to an optical axis O along which the eye A of a viewer is viewing. Reticle S is also bounded by a lateral edge S3 that joins bounding surfaces S1, S2. Bounding surface S1 carries a marking M. This marking M is disposed at an intermediate image plane of the optical device (telescope, microscope), so that marking M is superimposed on the image being viewed. Marking M may also be located on bounding surface S2, which faces the viewer.

In order for marking M to be easily seen against a dark background, luminous markings M are advantageous. For this purpose, the illumination device must direct the light of light source L onto marking M as efficiently as possible and with a suitable angular distribution. An example of a suitable light source L is an LED.

Marking M may be, for example, a diffraction grating that is illuminated at a suitable angle such that the first diffraction order of the reflected light is nearly parallel to optical axis O and propagates toward eye A. The grating may be an amplitude grating (e.g., chromium grating lines on glass) or a phase grating (steps etched into glass). However, structures produced using an etch-and-fill process are also possible. In such a process, depressions are etched into the glass and filled with a light-scattering material.

Optical component P resembles a prism and has different functional surfaces. Divergent light from light source L enters optical component P through an entrance face E. In this exemplary embodiment, entrance face E has an aspherical shape and therefore acts as a collecting lens. It converts the divergent incident light into a convergent beam, whose focus may be in front of, in, or behind marking M. The position of the focus may be selected such that marking M is optimally illuminated.

The light coming from entrance face E is incident on a reflecting face R, where it is redirected by total internal reflection toward reticle S. Optical component P is bonded by a transparent adhesive to edge S3 of reticle S. In this region, the light exits optical component P and enters reticle S.

Within reticle S, the light may travel directly to marking M, or, as shown, may first be totally reflected at a bounding surface S1, S2 of reticle S, possibly several times.

Since both entrance face E and reflecting face R of optical component P have their optical effect only because of their shape and due to the difference in refractive index between the material of component P and the surrounding medium, the optical component can be monolithically manufactured by injection molding from a suitable plastic.

Figure 2:
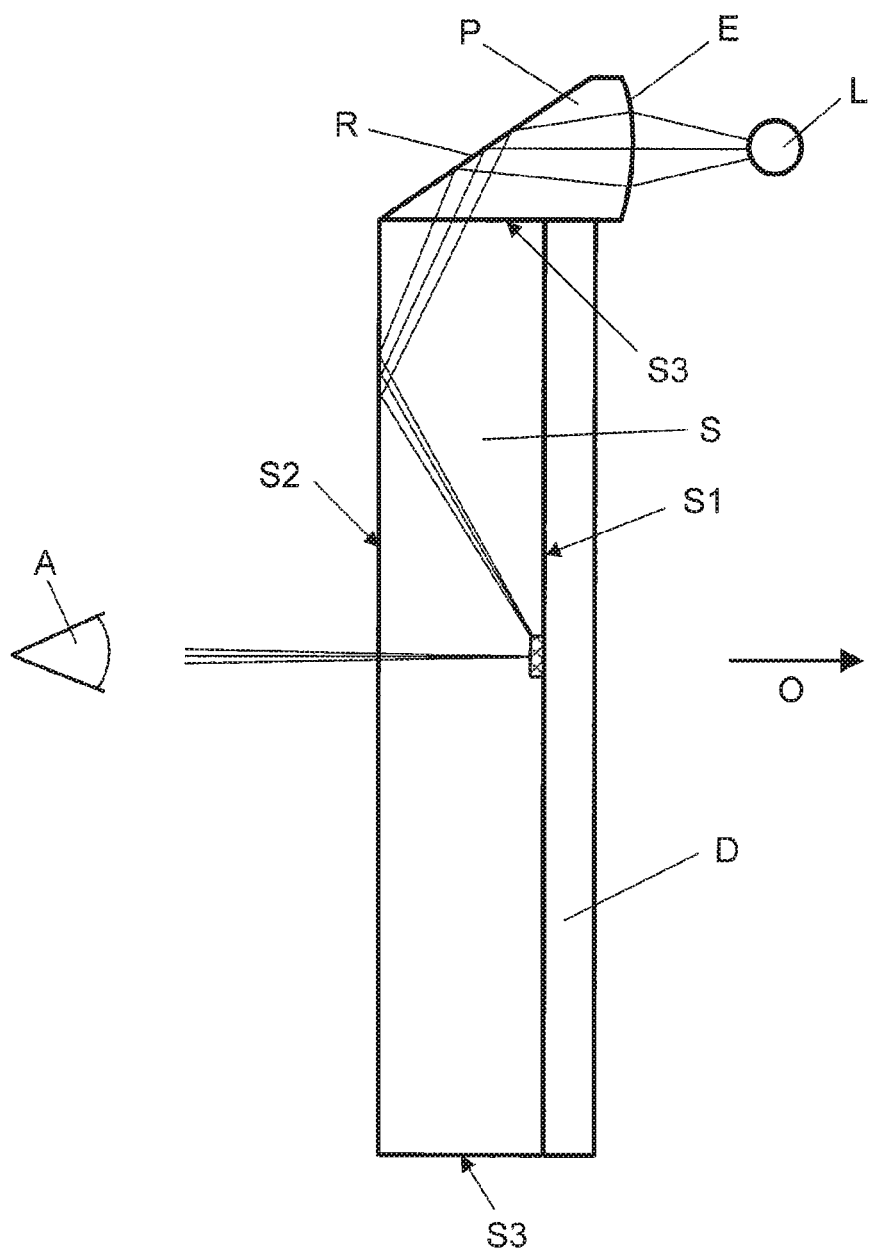
FIG. 2 shows a modification of the reticle of FIG. 1.

FIG. 2 shows an enhanced embodiment of reticle S. Here, marking M is covered by a transparent cover D which is cemented to the actual reticle S and may, for example, take the form of a cover glass. Since marking M is located at the intermediate image plane of an optical device, the outer surfaces of reticle S and cover D are located outside the intermediate image plane. Because of this, any dirt on these surfaces are not sharply imaged, and thus reticle S becomes more insensitive to dirt. Marking M is thereby also protected from mechanical damage.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A reticle comprising:
   an illumination device including an optical component configured to introduce light from a light source into the reticle, the optical component having an entrance face and a reflecting face for the light of the light source;
   two parallel bounding surfaces oriented perpendicular to an optical axis and having an optical marking; and
   a peripheral edge joining the bounding surfaces, the optical component being disposed at the peripheral edge of the reticle such that the light of the light source enters the reticle via the entrance face and the reflecting face and impinges on the marking,
   wherein the entrance face is configured to act as a collecting lens on which the light of the light source impinges divergently, and
   wherein the entrance face is configured to convert the divergent incident light of the light source into a convergent beam.

2. The reticle as recited in claim 1, wherein the entrance face is configured as an aspherical lens or as a Fresnel lens or is provided with a diffractive optic.

3. The reticle as recited in claim 1, wherein the reflecting face is configured to reflect the light incident from the light source by total internal reflection.

4. The reticle as recited in claim 1, wherein the optical component is formed as a monolithic injection-molded part.

5. The reticle as recited in claim 4, wherein the optical component includes holding structures for the light source.

6. The reticle as recited in claim 1, further comprising the light source, wherein the light source is a divergently emitting LED.

7. The reticle as recited in claim 1, wherein the optical component is bonded by a transparent adhesive to the peripheral edge of the reticle.

8. The reticle as recited in claim 1, wherein the marking is configured as a phase grating or an amplitude grating or takes the form of a light-scattering material so as to cause the light of the light source that is incident from the peripheral edge to be directed in the direction of the optical axis.

9. The reticle as recited in claim 1, wherein the marking is covered by a transparent cover that is joined to the reticle.

10. An optical device comprising:
    a reticle comprising:
      an illumination device including an optical component configured to introduce light from a light source into the reticle, the optical component having an entrance face and a reflecting face for the light of the light source;
      two parallel bounding surfaces oriented perpendicular to an optical axis and having an optical marking; and
      a peripheral edge joining the bounding surfaces, the optical component being disposed at the peripheral edge of the reticle such that the light of the light source enters the reticle via the entrance face and the reflecting face and impinges on the marking,
      wherein the entrance face is configured to act as a collecting lens on which the light of the light source impinges divergently, and
    wherein the marking is disposed at an intermediate image plane of the optical device.

11. The optical device as recited in claim 10, wherein the entrance face is configured to convert the divergent incident light of the light source into a convergent beam.

12. The optical device as recited in claim 10, wherein the entrance face is configured as an aspherical lens or as a Fresnel lens or is provided with a diffractive optic.

13. The optical device as recited in claim 10, wherein the marking is covered by a transparent cover that is joined to the reticle.

14. A reticle comprising:
- an illumination device including an optical component configured to introduce light from a light source into the reticle, the optical component having an entrance face and a reflecting face for the light of the light source;
- two parallel bounding surfaces oriented perpendicular to an optical axis and having an optical marking; and
- a peripheral edge joining the bounding surfaces, the optical component being disposed at the peripheral edge of the reticle such that the light of the light source enters the reticle via the entrance face and the reflecting face and impinges on the marking,
- wherein the entrance face is configured to act as a collecting lens on which the light of the light source impinges divergently, and
- wherein the entrance face is configured as an aspherical lens or as a Fresnel lens or is provided with a diffractive optic.

15. The reticle as recited in claim 14, wherein the reflecting face is configured to reflect the light incident from the light source by total internal reflection.

16. The reticle as recited in claim 14, wherein the optical component is formed as a monolithic injection-molded part.

17. The reticle as recited in claim 14, further comprising the light source, wherein the light source is a divergently emitting LED.

18. The reticle as recited in claim 14, wherein the optical component is bonded by a transparent adhesive to the peripheral edge of the reticle.

19. The reticle as recited in claim 14, wherein the marking is configured as a phase grating or an amplitude grating or takes the form of a light-scattering material so as to cause the light of the light source that is incident from the peripheral edge to be directed in the direction of the optical axis.

20. The reticle as recited in claim 14, wherein the marking is covered by a transparent cover that is joined to the reticle.

* * * * *